UNITED STATES PATENT OFFICE 2,546,520

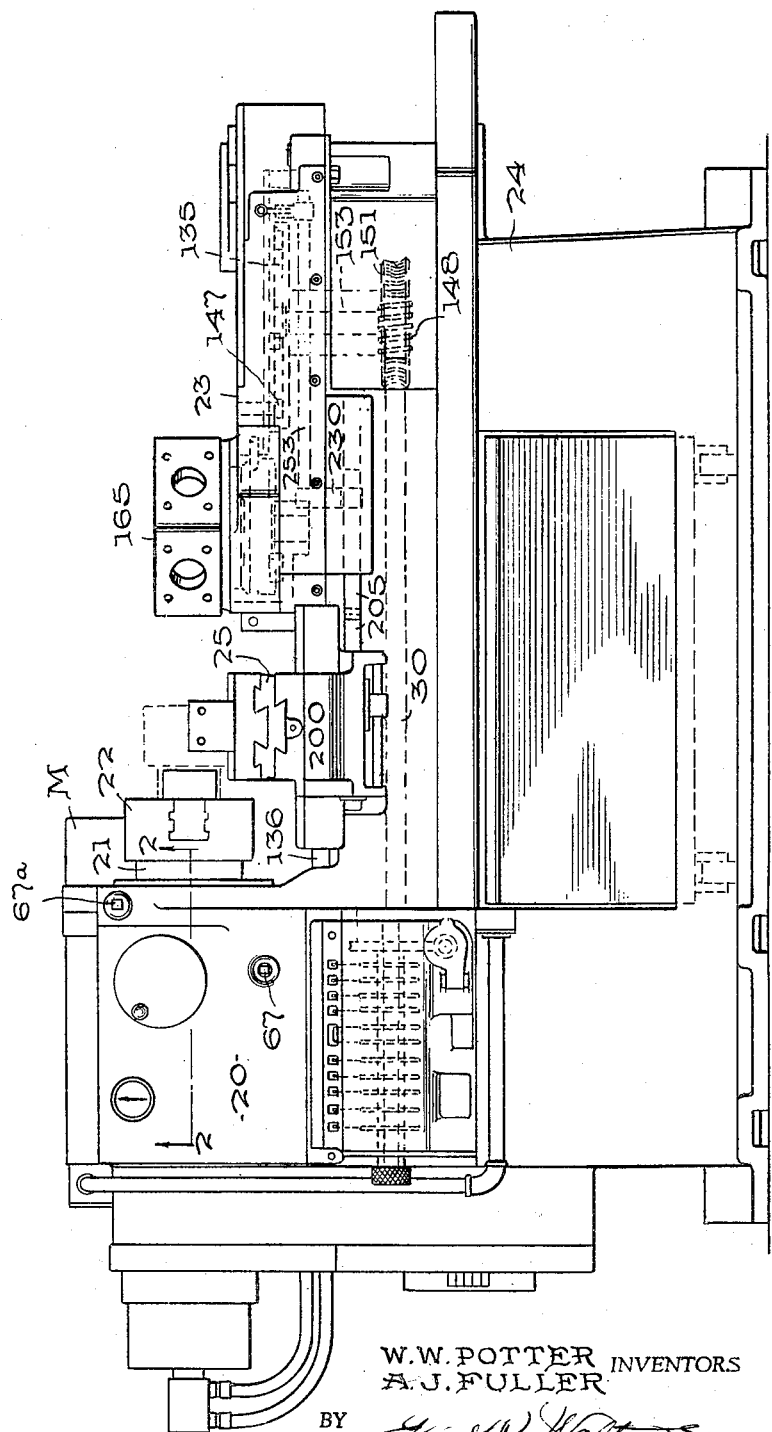

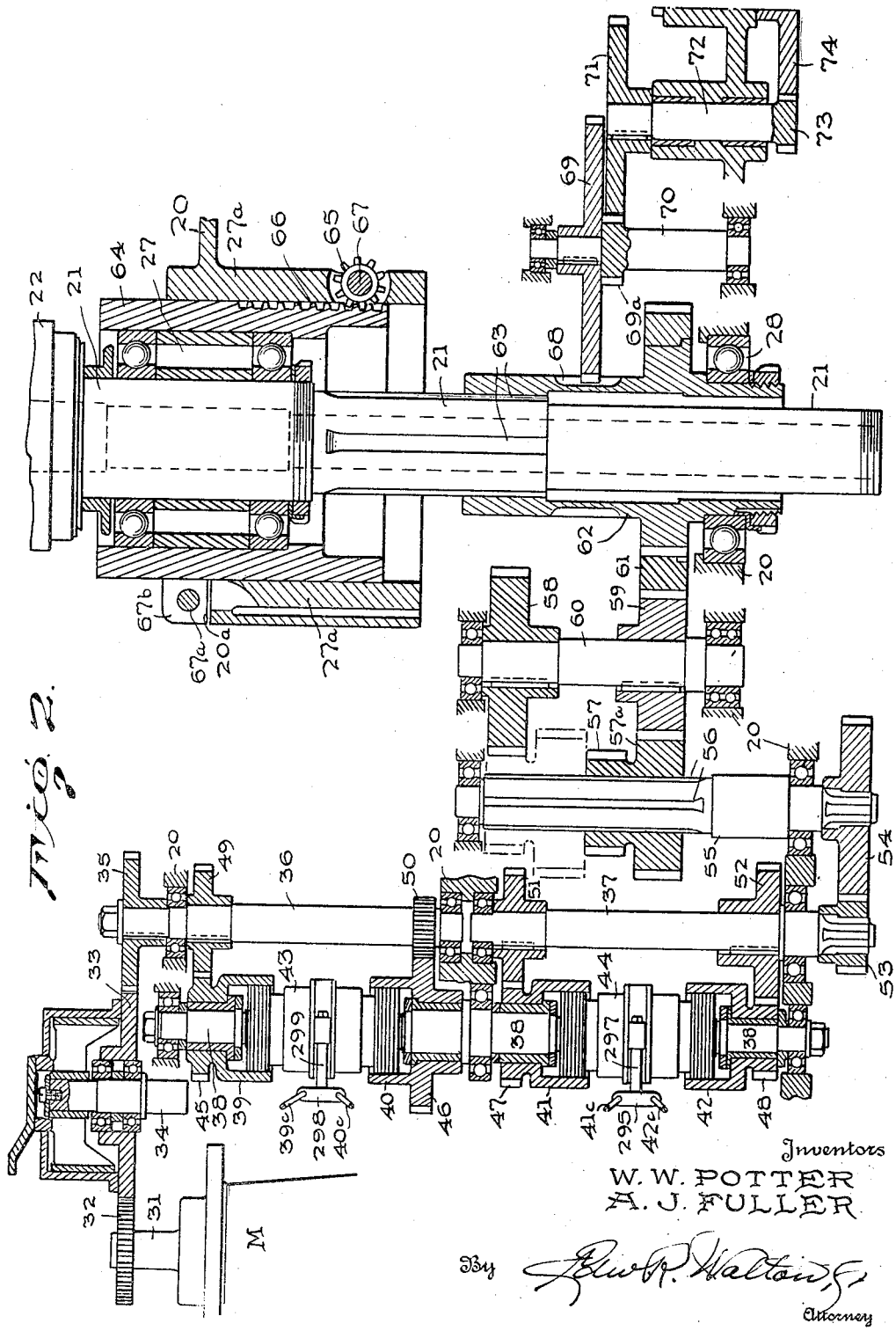

MACHINE TOOL

William Wallace Potter and Alfred Joseph Fuller, Pawtucket, R. I., assignors, by mesne assignments, to Niles-Bement-Pond Company, West Hartford, Conn., a corporation of New Jersey Original application May 26, 1944, Serial No. 537,490, now Patent No. 2,455,876, dated December 7, 1948. Divided and this application March 25, 1946, Serial No. 656,930. In Great Britain March 28, 1945

3 Claims. (Cl. 82—28)

The present invention relates to improvements in spindle mountings for rotating chuck-carrying spindles of turret lathes, wherein said spindles may be adjusted axially at will, or as requirements demand, to move the chuck carrying end of the spindle toward or from the tools or workpiece carried on the reciprocating slide or turret, as the case may be, so as to accommodate the parts to the thickness or dimensions of any work-piece being operated upon or to increase or decrease the distance between the work-piece and the tools as it is understood by those skilled in the art. This application is a division of pending application Serial No. 537,490, filed May 26, 1944, Patent No. 2,455,876, issued December 7, 1948.

The invention resides in the novel mounting means provided for the spindle to be adjusted, above mentioned that will resist end-wise thrust imposed on the spindle due to cutting or boring operations and will precisely and firmly lock and bind the spindle in adjusted position to the machine housing.

In the drawings, which show the preferred embodiment of the invention as it is at present employed—

Figure 1 is a front elevation of the machine tool of the automatic turret lathe type, as an example of one type of machine on which the invention is adapted; and Figure 2 is a transverse sectional view taken through the machine substantially on line 2—2 of Figure 1 illustrating the spindle mounting and further showing lay-out of the power transmission means for driving the spindle.

In order that an understanding may be had of the type of machine in which the present invention is particularly useful, there is shown in Figure 1, an automatic turret lathe having a head-stock 20 in which is disposed a horizontal rotatable spindle 21 and the variable transmission unit for driving the spindle, which has a chuck 22 carried on one end thereof in cooperative relation with a turret slide 23 mounted on the bed 24 disposed at one side of the head-stock 20, and reciprocable to and from the chuck 22 longitudinally of the spindle 21, as well as having cross slides 25 mounted on the bed 24 between the chuck and the turret slide. The turret slide 23 may carry an indexable turret 165 which is polygonal on its peripheral face and to which turret faces may be secured tools or work-pieces to be machined. In the latter case, the tools would be carried in the chuck 22.

According to the present invention, the spindle 21 is rotatably mounted in the end walls of the head-stock housing 20 in bearings 27 and 28 (see Fig. 2) and is driven from a constant speed motor shaft 31 actuated from a pulley (not shown) or by an electric motor M supported on an end wall of the headstock casing 20. The drive from the motor shaft 31 is through a gear 32 keyed thereon and meshing with idler gear 33 on shaft 34, which idler gear drives gear 35. These shafts and gears run at constant speed while the machine is in operation. From the driving gear 35, the gearing to the spindle 21 includes four automatic speed changes, which is accomplished by the gearing and clutch mechanisms indicated by the parts 36, 37, 38, 39, 40, 41, 42, 43, 44, 45, 46, 47, 48, 49, 50, 51 and 52, by a pair of hand-change gears 53 and 54, high or low-speed range gears 57 and 57a splined at 56 on shaft 55 and meshing with gears 58 or 59 keyed on shaft 60. Gear 59 meshes with gear 61 keyed to a sleeve bearing 62 in which the rear end of the spindle 21 is splined, at 63, for longitudinal adjustment therein. The bearing sleeve 62, as are the shaft 55 and jackshaft 60, is journaled as in radial ball-bearing 28, in the headstock 20, which bearing 28 takes none of the thrust load imposed on the spindle.

The front or chuck end of the spindle 21 is journaled in two radial ball bearings 27, of the preloaded type, disposed within a bearing sleeve 64, which latter is slidably mounted for longitudinal movement in a bearing support 27a in the headstock housing 20 (see Fig. 2) in order to provide for adjustment of the spindle 21 longitudinally to or from a slide 23 or a turret face on said slide. Since the bearing 27 is preloaded in excess of any actual thrust load which may be imposed upon the spindle, the construction just described provides a self contained ball bearing mounting unit capable of taking end thrust at the chuck end of the spindle without distortion or undue strain.

The longitudinal adjustment of the spindle may be accomplished by the provision of a pinion 65 journaled on the headstock and engaging a rack 66 on the spindle bearing sleeve 64, the pinion being operated through a shaft 67 having a squared end extending through the headstock casing 20 (see Fig. 1) to be engaged by a suitable implement. The spindle is held in adjustable positions by the binding bolt 67a connecting the split ends of a band or ring portion 67b produced by severing circumferentially, as at 20a, for a distance the bearing support 27a on the housing 20 so as to clamp or bind the sleeve bearing 64, and hence the spindle, in its adjusted position to the head-stock housing 20. This means of binding clamps the sleeve 64 so firmly to the housing 20 that the former becomes in reality an integral part of the latter, thus holding the spindle precisely in its adjusted position and effectually eliminates the possibility of the sleeve 64, in which the spindle mounting is carried, from vibrating in its bore in the housing 20.

In the machine now being described the turret slide 23 and the cross slides 25 are driven from the spindle 21; and, to this end, the bearing sleeve 62 is provided with teeth 68 cut therein and meshing with the gear 69, keyed to jack shaft 70 which has a spur gear 69a fast thereon for driving the gear 71 keyed to the end of the stud shaft 72 which also has a gear 73 fast thereon meshing with gear 74 connected with drive means (not shown but fully shown and explained in the pending application above mentioned). This latter drive means actuates the slide feed shaft 30 which, through the worm 148 (Fig. 1) worm wheel 151 and shaft 153, actuates disc cam 135 which, in turn, through the cam-follower 147 carried by the turret slide 23, produces the requisite reciprocating movements of the latter and the indexing of the turret 165, and which movements of the turret slide 23 are transmitted through members 253, 230 and 205 to a mechanism in the housing 200 for reciprocating said cross-slides 25—also fully shown and described in the pending application aforesaid.

The construction above described provides a mounting unit for rotary spindles of chucking-turret lathes that permits the longitudinal or axial adjustability of the chuck 22 and that precisely and firmly maintains the chuck in its adjusted position against heavy end-wise thrust from the turret without disturbing the connection between the chuck and spindle 21 while preserving the integral character of the spindle, per se, and its positive connection with its power drive means.

Having thus described the invention in the manner in which it is performed, it is to be understood that the invention is not to be limited to the exact construction herein shown and described as it may be varied or modified in many respects which fall within the scope of the appended claims.

What is claimed as new is:

1. In a lathe, a headstock housing having spaced walls, a driven gear having an axial opening therethrough surrounded by laterally extending sleeve-like portions, one of said sleeve-like portions being journalled within a bearing in one of said walls of the headstock housing, a spindle splined in said axial opening of said gear, a sleeve-bearing surrounding the nose end portion of said spindle and slidably mounted in a complementary support portion of the other wall of said headstock housing for movement longitudinally of said spindle, two radial anti-frictional bearings of the preloaded type disposed axially of the nose end portion of said spindle and fixedly interposed between said spindle and said sleeve-bearing, means connected with said sleeve-bearing for moving the latter axially relative to the housing to adjust the nose of the spindle with respect to the headstock housing, the sleeve-bearing support portion of said housing having an operable clamping device thereon to directly bind an adjacent portion of said sleeve-bearing in its precisely adjusted position to said headstock housing.

2. In a lathe in which there is a turret slide and a cooperating spindle rotatably journalled and longitudinally adjustable in headstock of the lathe and adapted to carry a chuck at its nose end adjacent said turret slide, the improvement residing in the chuck end of the spindle being journalled in a sleeve-bearing slidably mounted in a complementary support portion of the headstock housing for movement longitudinally of said spindle, anti-frictional bearings fixedly interposed between said spindle and said sleeve-bearing and of the type capable of resisting end thrust on the chuck end portion of said spindle, operable means for axially adjusting said sleeve-bearing and, hence, the chuck end of said spindle relative to said turret slide, the said support portion of the headstock housing for said sleeve-bearing being split to form a clamping ring about said sleeve-bearing, and an operable means for tightening and loosening said clamping ring, whereby the spindle may be bound to the headstock housing and maintained in its precisely adjusted position against heavy end thrust imposed on the nose end of the spindle.

3. In a lathe or like machine tool having a headstock in which a spindle is rotatably mounted and having a slide to cooperate with the spindle, the improvement comprising a spindle bearing support provided on the wall of the headstock adjacent the slide, a bearing-sleeve slidably mounted in the bearing support and having the chuck nose end portion of the spindle extending through said bearing-sleeve, bearing means fixed in said bearing-sleeve and to the chuck nose end portion of said spindle for permitting rotatable movement but preventing axial movement of the spindle relative to said bearing-sleeve, means for adjusting the bearing-sleeve and hence the nose end of the spindle axially in the bearing support relative to said slide, means formed partly by the bearing support for clamping the bearing-sleeve against axial and turning movement in the bearing support so that the spindle may be held in its precisely adjusted positions against heavy end thrust imposed upon the nose or chuck end of the spindle, and other bearing means in the headstock for supporting the opposite end of the spindle remote from the chuck nose end portion of the latter.

WILLIAM WALLACE POTTER.
ALFRED JOSEPH FULLER.

REFERENCES CITED

The following references are of record in the file of this patent:

UNITED STATES PATENTS

| Number | Name | Date |
|---|---|---|
| 1,842,704 | Voss | Jan. 26, 1932 |
| 2,089,363 | Haas | Aug. 10, 1937 |
| 2,115,094 | Bucklein | Aug. 26, 1938 |